United States Patent
Ramarao et al.

(10) Patent No.: US 10,990,757 B2
(45) Date of Patent: Apr. 27, 2021

(54) CONTEXTUAL WINDOWS FOR APPLICATION PROGRAMS

(71) Applicant: Microsoft Technology Licensing, LLC, Redmond, WA (US)

(72) Inventors: Pranav Ramarao, Chenai (IN); Suresh Parthasarathy Iyengar, Bangalore (IN); Balasubramanyan Ashok, Bellevue, WA (US); Pushkar V. Chitnis, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 218 days.

(21) Appl. No.: 16/301,298

(22) PCT Filed: May 12, 2017

(86) PCT No.: PCT/US2017/032556
§ 371 (c)(1),
(2) Date: Nov. 13, 2018

(87) PCT Pub. No.: WO2017/197365
PCT Pub. Date: Nov. 16, 2017

(65) Prior Publication Data
US 2020/0327282 A1    Oct. 15, 2020

(30) Foreign Application Priority Data
May 13, 2016  (IN) .............................. 201641016843

(51) Int. Cl.
*G06F 17/27* (2006.01)
*G06F 40/274* (2020.01)
(Continued)

(52) U.S. Cl.
CPC ............ *G06F 40/274* (2020.01); *G06F 3/048* (2013.01); *G06F 16/90324* (2019.01)

(58) Field of Classification Search
None
See application file for complete search history.

(56) References Cited

U.S. PATENT DOCUMENTS

| 8,175,644 B1 | 5/2012 | Jeffrey |
| 8,201,096 B2 | 6/2012 | Robert et al. |

(Continued)

OTHER PUBLICATIONS

"Command-line switches for Microsoft Office products—Office Support Command-line switches for Microsoft Office products", Retrieved from: https://support.office.com/en-us/article/Command-line-switches-for-Microsoft-Office-products-079164cd-4ef5-4178-b235-441737deb3a6?ui=en-US&rs=en-US&ad=US#IDOEAABAAA= Outlook, Aug. 15, 2017, 6 Pages (Continued)

*Primary Examiner* — Satwant K Singh
(74) *Attorney, Agent, or Firm* — Schwegman Lundberg & Woessner, P.A.

(57) ABSTRACT

A method and system for changing content of a window of an application program is provided. A contextual window system displays a window with content based on a current context of the window. The contextual window system receives from a user a context string for a new context for the window. When the context string includes a command, the contextual window system performs a function of the application program that implements the command to change from the current context of the window to the new context of the window. When the context string does not specify a command, the contextual window system submits the context string as a query for data of the application program to change from the current context of the window to the new context of the window. The contextual window system then modifies the content of the window to reflect the new context of the window.

18 Claims, 12 Drawing Sheets

(51) Int. Cl.
*G06F 16/9032* (2019.01)
*G06F 3/048* (2013.01)

(56) References Cited

U.S. PATENT DOCUMENTS

| | | | |
|---|---|---|---|
| 8,836,643 B2 | 9/2014 | Romera Joliff et al. | |
| 9,317,605 B1 | 4/2016 | Zivkovic et al. | |
| 9,323,722 B1 | 4/2016 | Kol | |
| 9,910,884 B2* | 3/2018 | Churchill | G06F 3/04817 |
| 9,990,111 B2* | 6/2018 | Tan | A63F 13/25 |
| 10,210,242 B1 | 2/2019 | Zivkovic et al. | |
| 2002/0002453 A1 | 1/2002 | Lazaridis et al. | |
| 2004/0128138 A1 | 7/2004 | Andrews et al. | |
| 2007/0143688 A1* | 6/2007 | Cheng | G06F 40/131 |
| | | | 715/738 |
| 2007/0300185 A1 | 12/2007 | Macbeth et al. | |
| 2008/0177726 A1 | 7/2008 | Forbes et al. | |
| 2008/0307343 A1 | 12/2008 | Robert et al. | |
| 2010/0070898 A1 | 3/2010 | Langlois et al. | |
| 2012/0016678 A1 | 1/2012 | Gruber et al. | |
| 2012/0144330 A1 | 6/2012 | Flint | |
| 2012/0192096 A1* | 7/2012 | Bowman | G06F 3/0481 |
| | | | 715/780 |
| 2013/0006629 A1 | 1/2013 | Honda et al. | |
| 2013/0178241 A1 | 7/2013 | Duggirala et al. | |
| 2014/0188335 A1 | 7/2014 | Madhok et al. | |
| 2014/0195905 A1 | 7/2014 | Dodge | |
| 2015/0169285 A1 | 6/2015 | Reyes et al. | |
| 2015/0199085 A1 | 7/2015 | Churchill et al. | |
| 2015/0199086 A1* | 7/2015 | Churchill | G06F 3/04817 |
| | | | 715/739 |
| 2015/0266298 A1 | 9/2015 | Kifuku | |
| 2016/0004301 A1 | 1/2016 | Stachniak et al. | |
| 2016/0085840 A1* | 3/2016 | Dixit | G06F 3/0481 |
| | | | 707/602 |
| 2016/0239569 A1* | 8/2016 | Levy | G06F 16/951 |
| 2016/0299973 A1 | 10/2016 | Oakeson | |
| 2018/0329592 A1* | 11/2018 | Ramarao | G06F 3/0237 |
| 2020/0327148 A1* | 10/2020 | Dixit | G06F 3/0488 |

OTHER PUBLICATIONS

"Find a message or item with Instant Search", Retrieved from: https://support.office.com/en-us/article/Find-a-message-or-item-with-Instant-Search-69748862-5976-47b9-98e8-ed179f1b9e4d#IDOEAABAAA=2010, Aug. 15, 2017, 2 Pages.

"Gmail Search", Retrieved from: https://www.youtube.com/watch?v=Zd79-NZrqEg, Feb. 4, 2013, 5 Pages.

"Interacting with Other Apps", Retrieved from: https://developer.android.com/training/basics/intents/index.html, Retrieved Date: May 2, 2016, 2 Pages.

"Non Final Office Action Issued in U.S. Appl. No. 15/594,474", dated Apr. 16, 2019, 13 Pages.

Bhole, et al., "On Correcting Misspelled Queries in Email Search", In Proceedings of the Twenty-Ninth AAAI Conference on Artificial Intelligence, Jan. 25, 2015, pp. 4266-4267.

Gualtieri, Mike, "Predictive Apps are the Next Big Thing in App Development", Retrieved from: https://go.forrester.com/blogs/13-08-28-predictive_apps_are_the_next_big_thing_in_app_development/, Aug. 28, 2013, 6 Pages.

Kumar, et al., "Hashing-based Approaches to Spelling Correction of Personal Names", In Proceedings of the Conference on Empirical Methods in Natural Language Processing, Oct. 9, 2010, pp. 1256-1265.

Kumar, et al., "Multilingual People Search", In Proceedings of the 33rd International ACM SIGIR Conference on Research and Development in Information Retrieval, Jul. 19, 2010, p. 708.

"International Search Report and Written Opinion Issued in PCT Application No. PCT/US2017/032556", dated Aug. 28, 2017, 10 Pages.

Trice, Andrew, "Adaptive Mobile Apps that Change based on Personal Context", Retrieved from: http://www.tricedesigns.com/2015/08/26/adaptive-mobile-apps-that-change-based-on-personal-context/, Aug. 26, 2015, 4 Pages.

"Final Office Action Issued in U.S. Appl. No. 15/594,474", dated Oct. 31, 2019,13 Pages.

* cited by examiner

FIG. 6

600 | 610 | 630
Seattle to DC | pin

620

1. American
   4/1  12:05  310 ...    $376
   4/1   5:15  968 ...    $401

2. Alaska
   4/1  10:40  486 ...    $375

3. Delta
   4/1  11:30  1201 ...   $410
   4/1   4:10  799 ...    $395

FIG. 7

700 | 710 | 730
Seattle to DC  #book AA 310 | pin

720

1. American
   4/1  12:05  310 ...    $376

721
Traveler:  First: _____  Last: _____   ☒ ☑

4/1   5:15  968         $401

2. Alaska
   4/1  10:40  486         $375

3. Delta
   4/1  11:30  1201        $410

US 10,990,757 B2

CONTEXTUAL WINDOWS FOR APPLICATION PROGRAMS

CROSS-REFERENCE TO RELATED APPLICATIONS

This application is a U.S. National Stage Filing under 35 U.S.C. 371 of International Patent Application Serial No. PCT/US2017/032556, filed May 12, 2017, and published as WO 2017/197365 A1 on Nov. 16, 2017, which claims priority to Indian Patent Application No. 201641016843, filed on May 13, 2016, which applications and publication are incorporated herein by reference in their entireties.

BACKGROUND

Many application programs provide users with a wide range of sophisticated functions for processing its data. For example, a word processing program may provide functions for formatting text of a document, performing grammatical analysis, laying out pages of the document, creating tables of content for a document, importing images into a document, defining equations for the document, updating metadata of the document, and so on. The user interfaces of such application programs can be quite complex. For example, a word processing program may provide many menus that may have sub-menus and various tool bars. It can be difficult for a user to navigate through such a complex user interface to find needed functions. Moreover, many users may not even know of the existence of some functions that may be particularly useful to the task that the user is currently performing.

The user interfaces of such application programs provide a variety of pop-up windows, dialog boxes, and other user interface elements that overlay the current content of a window to support the performing of a specific task. For example, when a user wants to search for email messages in a particular folder and then compose a new email message based on the search results, an email application program may display a new window that overlays the current window covering the search results. Thus, the user will not be able to see the search results while composing the email message. To overcome this problem, the users of such application programs may need to navigate through several different windows opening and moving various windows resulting in a high degree of window switches. In the case of devices with small screens such as smart phones, the problem of window switching presents additional problems as the screens are too small to display multiple windows simultaneously. For example, when a user is composing an email message, the user is not able to view a list of related email messages. In other words, the window of the application is tied to a particular user action.

SUMMARY

A method and system for changing content of a window of an application program is provided. A contextual window system displays a window with content based on a current context of the window. The contextual window system receives from a user a context string for a new context for the window. When the context string includes a command, the contextual window system performs a function of the application program that implements the command to change from the current context of the window to the new context of the window. When the context string does not specify a command, the contextual window system submits the context string as a query for data of the application program to change from the current context of the window to the new context of the window. The contextual window system then modifies the content of the window to reflect the new context of the window.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 6 illustrates a contextual window listing flights that match a contextual string.

FIG. 7 illustrates a contextual window for assisting in booking a flight in some embodiments.

DETAILED DESCRIPTION

Figure 1:
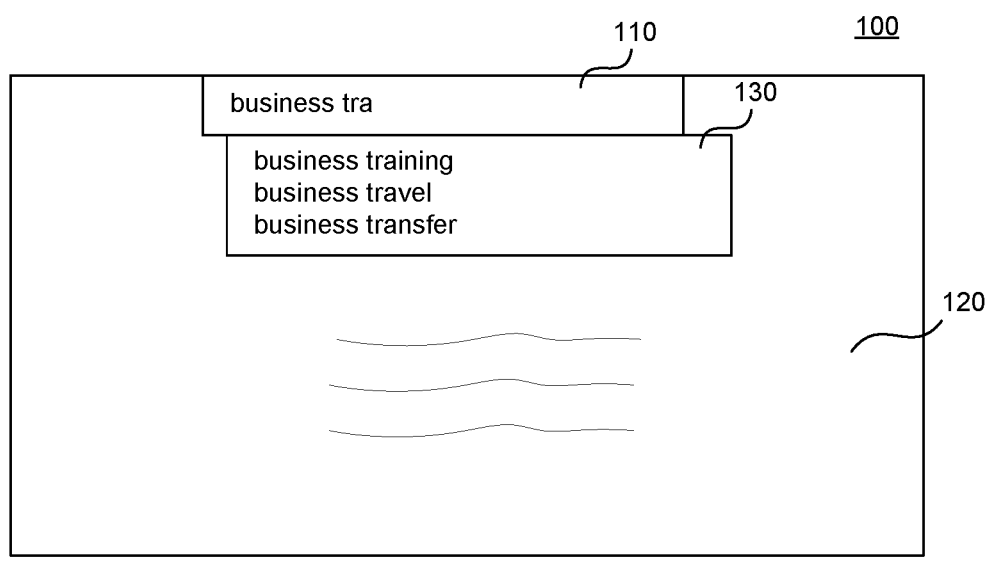
FIG. 1 illustrates auto-completion suggestions for a context string.

A method and system for changing content of a window of an application program to reflect a different context of the window is provided. In some embodiments, a contextual window system displays a window with content based on a current context of the window. For example, if the application program is an email program, the context of the window may relate to newly received email messages and the content of the window may be a list of newly received email messages. The contextual window system then receives from a user a context string for a new context for the application program. For example, the email program may display a context input area such as a text box so that the user may enter the context string. The contextual window system then determines whether the string contains a command. A command may be prefixed with a reserve symbol such as an octothorpe ("#"). For example, a command to delete email messages from John Doe may be indicated by the context string "# delete @johndoe." In this case, the command is indicated by "# delete," and "@johndoe" is a parameter for the command. The "at sign" ("@") is a reserve symbol used to specify the sender of the email messages to be deleted. In some embodiments, the contextual window system may extract a command or a name from the context string even without a reserve symbol to identify the command or the name. When the context string includes a command, the contextual window system performs a function of the application program that implements the command to change from the current context of the window to the new context of the window. Continuing with the example, the contextual window system would delete all email messages from John Doe and then re-display the list of newly received email messages. When the context string does not specify a command, the contextual window system may submit the context string as a query for data of the application program to change from the current context of the window to the new context of the window. For example, if the context string was "john doe project X," the contextual window system may search in the context of the current window (e.g., newly received email messages) for those email messages that relate to both John Doe and Project X. The contextual window system then updates the content of the window with a list of the email messages from the search result. The email messages may be ordered in various ways. For example, the email messages may be ordered based on relevance to the query (i.e., with a ranking) or alphabetically or chronologically. In some cases, the contextual window system may show attachments and links. The updated content of the window may also include handles, such as buttons and gestures.

In some embodiments, the contextual window system may support multiple contextual windows for an application program. Continuing with the example, if the user enters the context string "john doe project X &window," then the contextual window system may search in the context of the current window for those email messages that relate to both John Doe and Project X and display the results in a new window, rather than changing the context of the current window. The ampersand symbol ("&") indicates a parameter of the context string. The parameter "&window" indicates that the context is for a new window. The context string may have multiple parameters. For example, the context string "john doe project X &window &mail @janedoe" may indicate to also send the email messages of the search results via email to Jane Doe. The user may also explicitly open a new window and perform an action so that context can be preserved in multiple windows.

In some embodiments, the contextual window system may also allow a user to save the context of the window persistently, also referred to as pinning the context to a window. The contextual window system may display a pin button, and when the user selects the pin button, the contextual window system saves the current context of the window. For example, the saved context may be an indication of a search for "john doe project X" in received email messages. Alternatively, the user may simply say "# pin john doe project X" to change and pin the context. The contextual window system may monitor the state of the application program and update the content of a window with pinned context based on changes in state. For example, when a new email message is received that relates to John Doe and Project X, the contextual window system adds the email message to the content of the window. Whenever the application program is launched, the contextual window system may create a window for each saved context of a window and initialize the content of the window based on the saved context.

In some embodiments, the contextual window system may dynamically update the content of a window as the user enters a command string. For example, as the user enters the characters "john," the contextual window system may update the content of the window to list email messages related to any John. As the user continues on to enter "john doe," the contextual window system updates the content to list only email messages related to John Doe. If the user then deletes "doe" from the context string, then the contextual window system may update the window to again list email messages related to any John.

In some embodiments, the contextual window system may provide auto-correction suggestions, auto-completion suggestions, and/or name resolution suggestions as a user enters a contextual string. The contextual window system may employ various types of auto-correction and auto-suggestion techniques such as those described in Bhole, A. and Udupa, R., "On Correcting Misspelled Queries in Email Search," Proceedings of the 29th AAAI Conference on Artificial Intelligence, Jan. 25-30, 2015, Austin, Tex., USA, pp. 4266-67. The contextual window system may employ various types of name resolution suggestion techniques such as those described in Kumar, S. and Udupa, R., "Multilingual People Search," Proceedings of the 33rd International ACM SIGIR Conference on Research and Development in Information Retrieval (SIGIR 2010), Geneva, Switzerland, Jul. 19-23, 2010, p. 708, and Kumar, S. and Udupa, R., "Hashing-Based Approaches to Spelling Correction of Personal Names," Proceedings of the 2010 Conference on Empirical Methods in Natural Language Processing (EMNLP 2010), Oct. 9-11, 2010, MIT Stata Center, Cambridge, Mass., USA, pp. 1256-65. For example, as the user enters the context string of a query, the contextual window system provides auto-correction suggestions for misspelled words and auto-completion suggestions for partially complete words. As another example, as a user adds the name of a recipient of an email message to the context string, the contextual window system provides suggestions for the intended recipient from the address book of the user or from a general directory of names.

In some embodiments, the contextual window system may provide a voice interface for receiving a context string. When the voice interface is being used, the contextual window system may not display a context input area or may display a context input area and display the recognized text in the context input area. The contextual window system may also provide various tools to aid a user in providing the context for a window. For example, the context input area may include checkboxes for indicating whether a search is to be limited to data associated with the current context of the window or whether the search is to be of all data of the application program.

FIGS. 1-5 illustrate contextual windows for an email application in some embodiments. FIG. 1 illustrates auto-completion suggestions for a context string. A window 100 includes a context input area 110 and a content area 120. As the user enters the text into the context input area 110, the contextual window system displays auto-completion suggestions in a context assist box 130. As the user enters the text, the contextual window system may update the content of the content area 120. For example, as the user completed the word "business," the contextual window system may search for email messages relating to business and display a list of those email messages in the content area.

Figure 2:
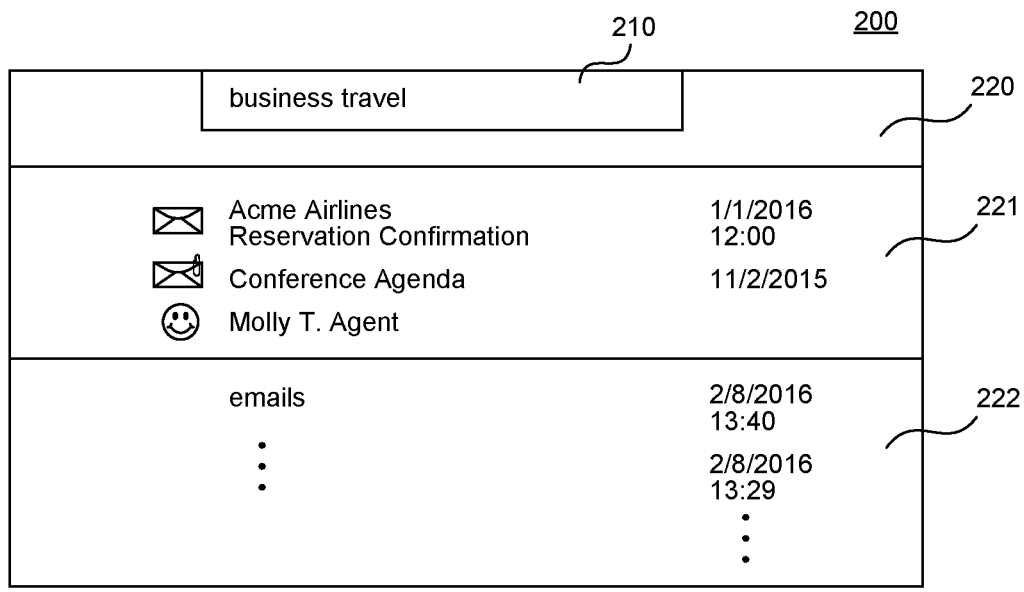
FIG. 2 illustrates the entry of a context string that represents a query.

FIG. 2 illustrates the entry of a context string that represents a query. A window 200 includes a context input area 210 and a content area 220. In this example, the user has entered the context string "business travel." The contextual window system uses the context string as a query for searching various email-related data such as email message content, email message attachments, links within an email message, address book contacts, and so on. The contextual window system displays the results of the query in results area 221 and displays received email messages in email list area 222. The results area 221 lists an email message received from Acme Airlines, an email attachment named "Conference Agenda," and a contact for Molly T. Agent. In some embodiments, the contextual window system may order the results based on the type of email related data. For example, links and attachments may be ordered before email messages or may be given an increased relevance.

Figure 3:
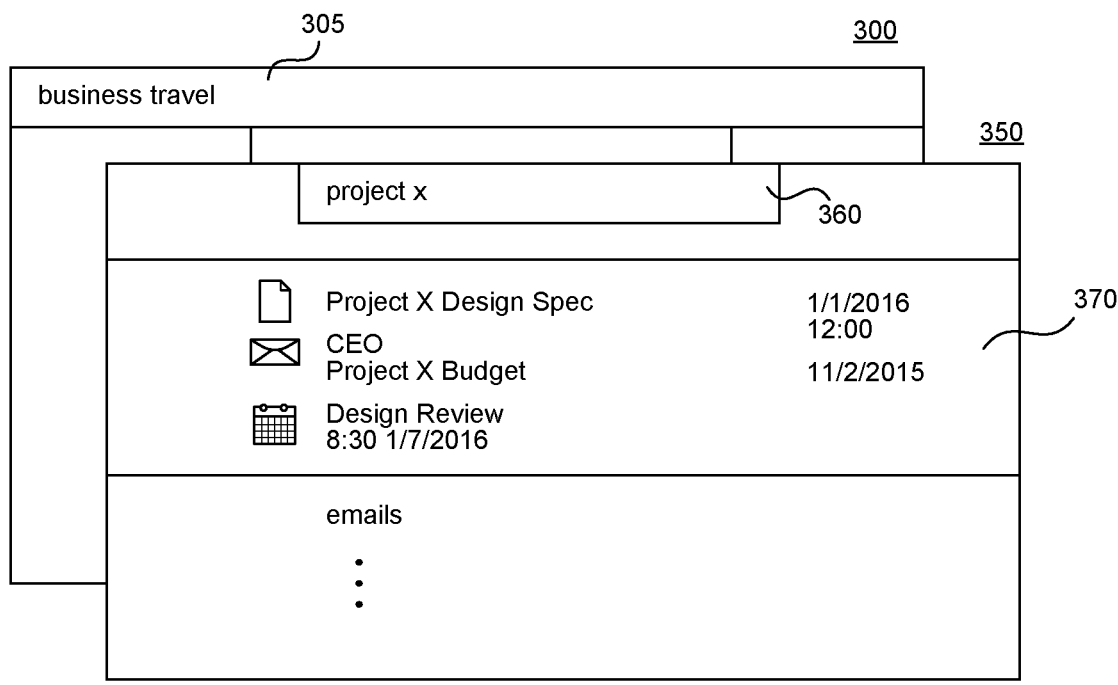
FIG. 3 illustrates multiple contextual windows.

FIG. 3 illustrates multiple contextual windows. A window 300 corresponds to window 200 after the context "business travel" has been pinned to the window. The context area 305 indicates the context that has been pinned to the window. A window 350 corresponds to a different window of the email application with a different context. Window 350 includes a context input area 360 and a content area 370. The content input area 360 includes the string "project X." The content area 370 may include email messages and other documents relating to Project X.

Figure 4:
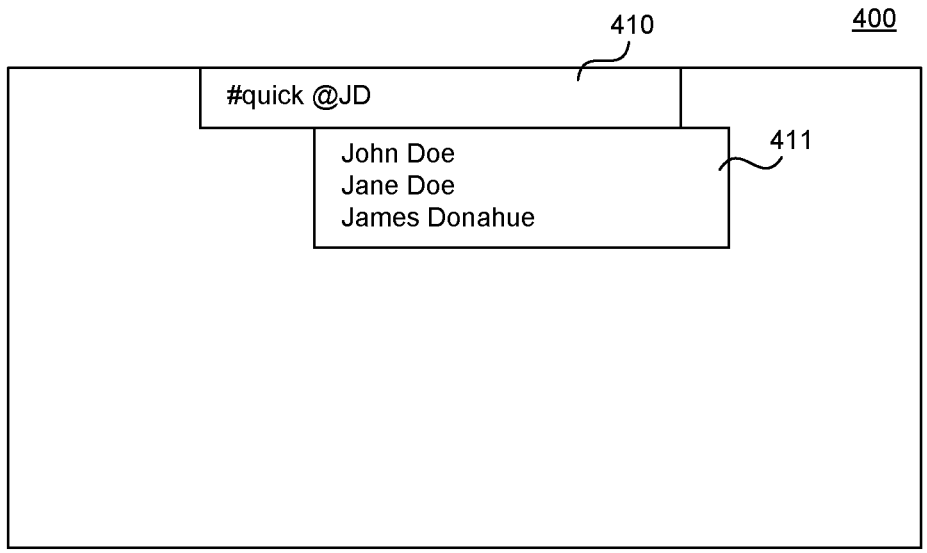
FIG. 4 illustrates name resolution suggestions for a context string.

FIG. 4 illustrates name resolution suggestions for a context string. A window 400 includes a context input area 410 that includes the string "# quick @JD." The command "# quick" indicates to send a quick email message with the text of the content string as the subject of the email. As the user enters the parameter "@JD," the contextual window system searches for contacts of the user that match the initials "JD" and displays the results in a context assist box 411. The context window system may allow users to send an instant message via a context string, for example, by using the command "# IM." If the recipient is currently not online, the contextual window system may send the message via email.

Figure 5:
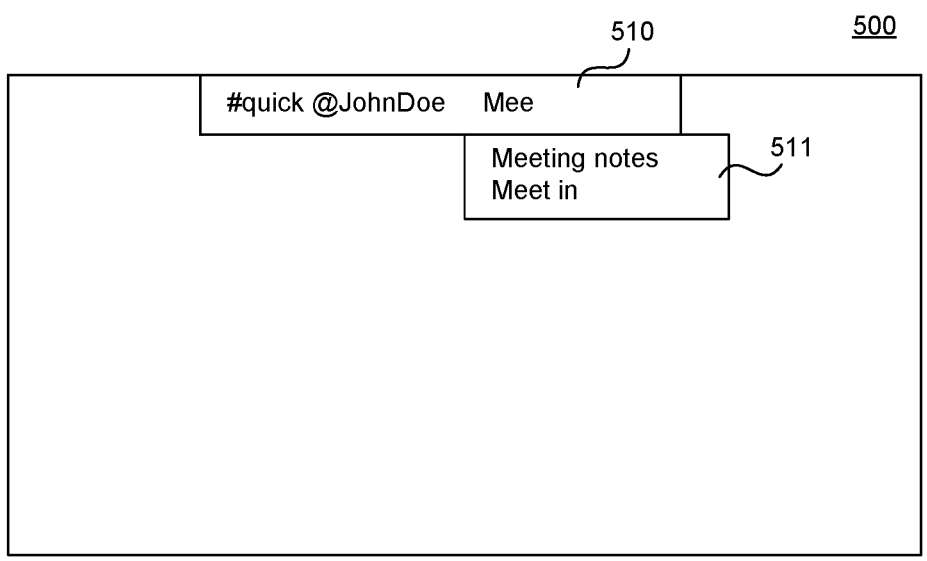
FIG. 5 illustrates auto-completion suggestions for a context string.

FIG. 5 illustrates auto-completion suggestions for a context string. A window 500 includes a context input area 510 and context assist area 511. The context assist window includes the string "# quick @JohnDoe III." The contextual window system displays auto-completion suggestions in the context assist area 511. When the user completes the context string, the contextual window system sends an email message to John Doe with the text of the context string as the subject of the email. If the user decides to add a body to the email, then the user may, for example, select an email icon or enter "# body" in the context input area and the contextual window system will change the context of the window to a compose email context with the recipient and the subject field initialized based on the context string. When the user enters "# body," the contextual window system may seamlessly morph the context input area as the user enters text into a compose area for composing a detailed email message.

FIGS. 6-9 illustrate contextual windows for a travel planning application in some embodiments. FIG. 6 illustrates a contextual window listing flights that match a contextual string. A window 600 includes a context input area 610, a content area 620, and a pin button 630. The context input area 610 includes the string "Seattle to DC," and the content area 620 lists matching flights. The matching flights may be, for example, one-way flights departing on the current day. The contextual window system may also support parameters such as "@departure" to indicate the desired departure date.

FIG. 7 illustrates a contextual window for assisting in booking a flight in some embodiments. A window 700 includes a context input area 710, a content area 720, and a pin button 730. The context input area 710 includes the context string "Seattle to DC # book AA 310." After the user entered the context string "Seattle to DC" and reviewed the flights, the user added to the input string "# book AA 310" to specify an intent to make a reservation on American Airlines flight 310. In response, the contextual window system displayed booking area 721 to allow the user to enter information for booking that flight. If, instead of booking a flight, the user wanted to just track the available flights over time, the user may have selected pin button 630 to pin the context string of context input area 610 to the window.

Figure 8:
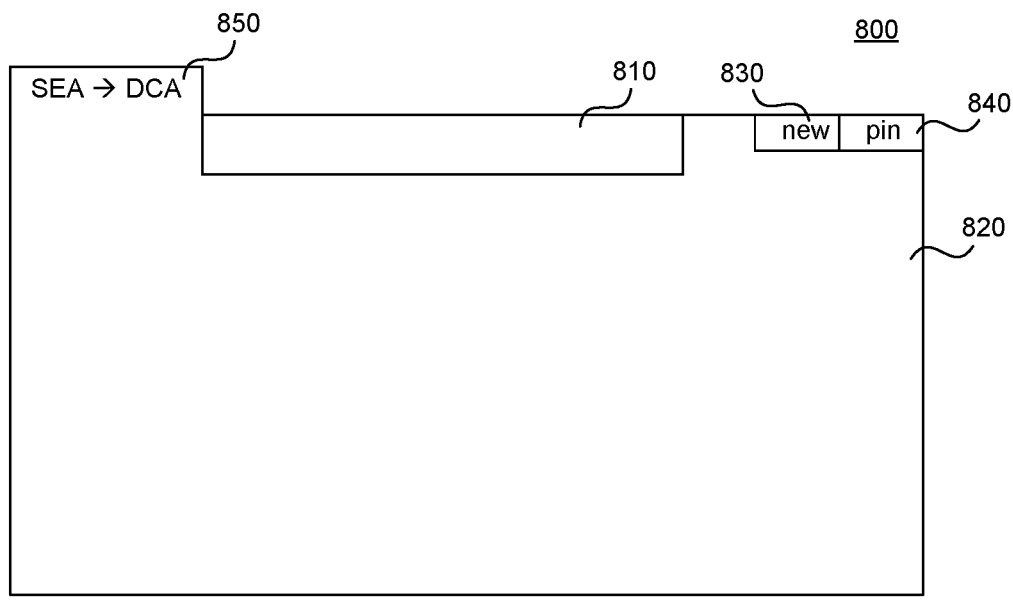
FIG. 8 illustrates context that is pinned to a window in some embodiments.

FIG. 8 illustrates context that is pinned to a window in some embodiments. A window 800 includes a context input area 810, a content area 820, a new button 830, a pin button 840, and a tab 850. In this example, the tab 850 indicates the context for searching for flights from Seattle to DC has been pinned to the window and a new window has been opened with a blank context input area and blank content area. If the user selects the tab 850, then the contextual window system would display window 600.

Figure 9:
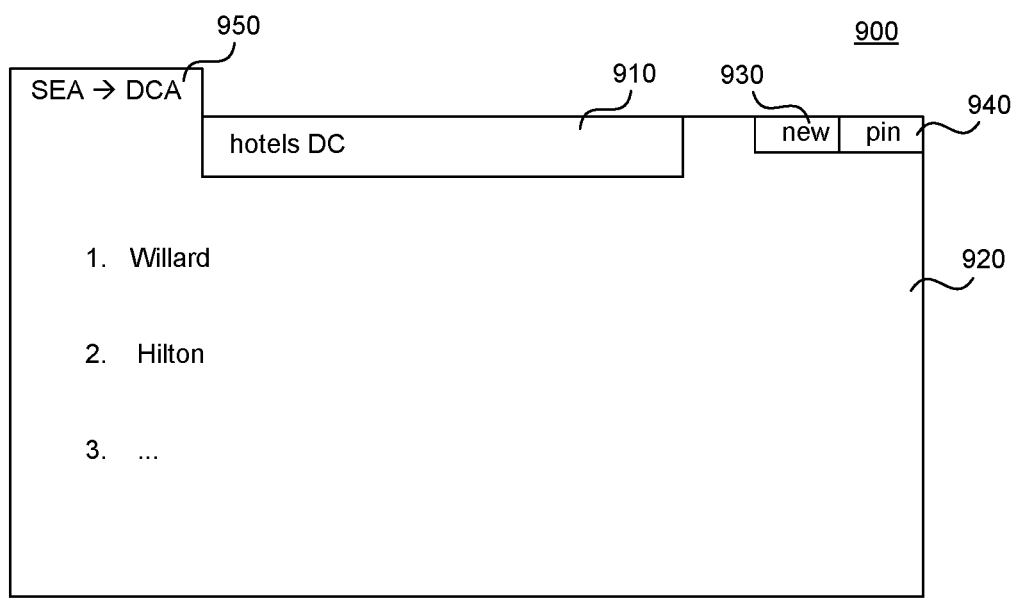
FIG. 9 illustrates a contextual window for the travel application in some embodiments.

FIG. 9 illustrates a contextual window for the travel application in some embodiments. A window 900 includes a context input area 910, a content area 920, a new button 930, a pin button 940, and a tab 950. The context input area 910 includes a context string "hotels DC," and the content area includes a list of hotels in DC.

Figure 10A:
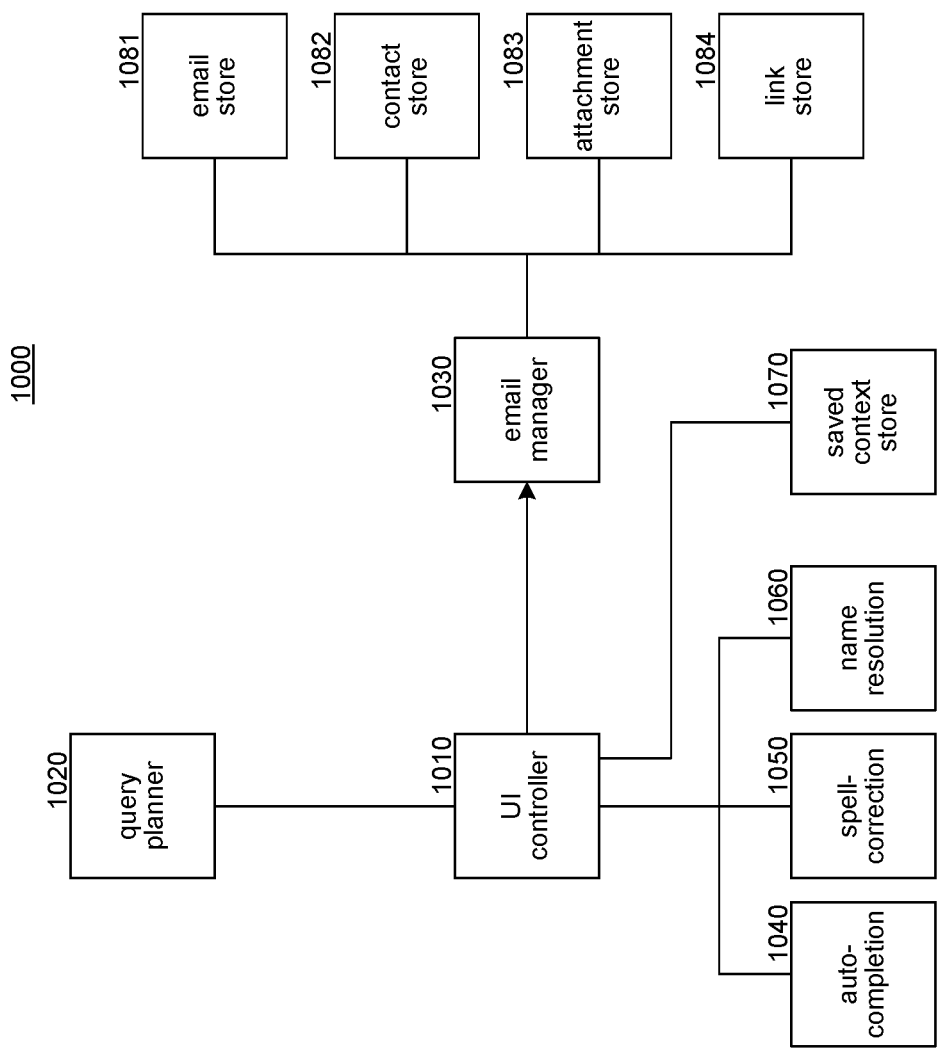
FIG. 10A is a block diagram that illustrates components of a contextual window system in some embodiments.

FIG. 10A is a block diagram that illustrates components of a contextual window system in some embodiments. A contextual window system 1000 includes a UI controller 1010, a query planner 1020, an email manager 1030, an auto-completion component 1040, a spell-correction component 1050, a name resolution component 1060, a saved context store 1070, an email store 1081, a context store 1082, an attachment store 1083, and a link store 1084. The UI controller 1010 controls the overall processing of the contextual window system. When a contextual string is to be treated as a query, the UI controller 1010 provides the query to the query planner 1020 to develop a plan for the query. The UI controller 1010 may interface with the email manager 1030 to implement the query plan. The UI controller 1010 also identifies commands and interfaces with the email manager 1030 to affect execution of those commands. The UI controller 1010 stores saved context to the saved context store 1070 when a user pins context to a window. The email store 1081, contact store 1082, attachment store 1083, and link store 1084 all store information derived from the email messages such as attachments to the email messages and links found within the email messages.

Figure 10B:
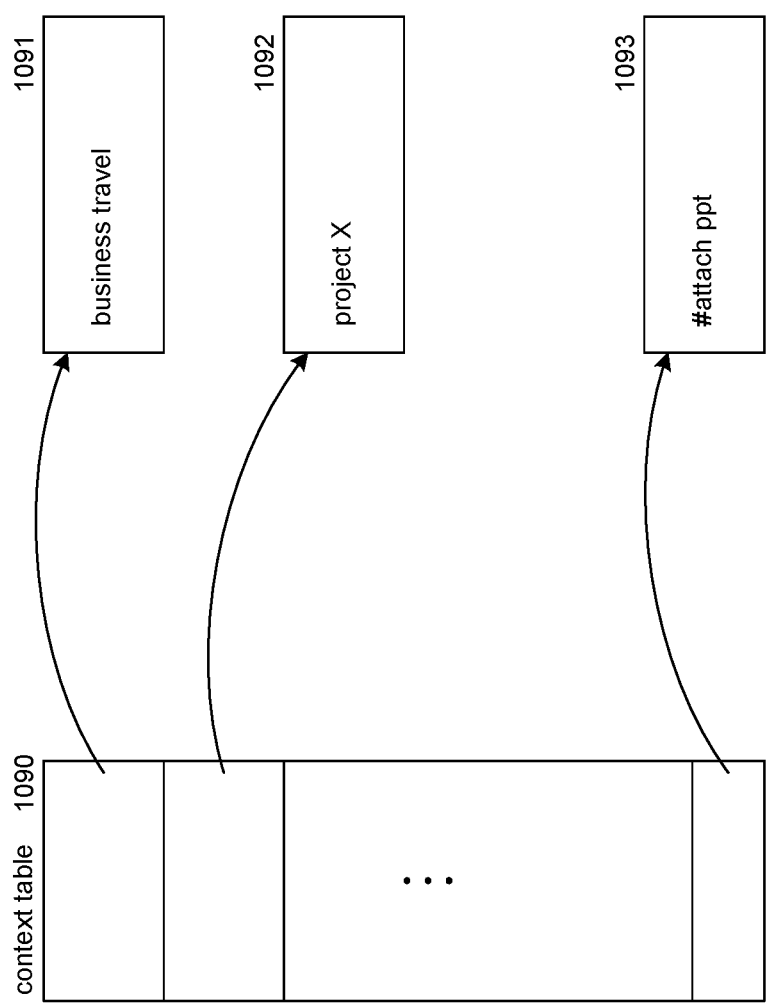
FIG. 10B illustrates the organization of a saved context store in some embodiments.

FIG. 10B illustrates the organization of a saved context store in some embodiments. The saved context store may include a context table 1090 with an entry for each saved context. Each entry may contain or point to information describing the saved contexts 1091 ("business travel"), 1092 ("project x"), and 1093 ("# attach ppt"). The saved context 1093 "# attach ppt" indicates that the context is to be attachments that are PowerPoint documents.

The computing systems on which the contextual window system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have data recorded on them or may be encoded with computer-executable instructions or logic that implements the contextual window system. The data transmission media are used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting deployment data using the keys.

The contextual window system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various examples. Aspects of the contextual window system may be implemented in hardware using, for example, an application-specific integrated circuit (ASIC).

Figure 11:
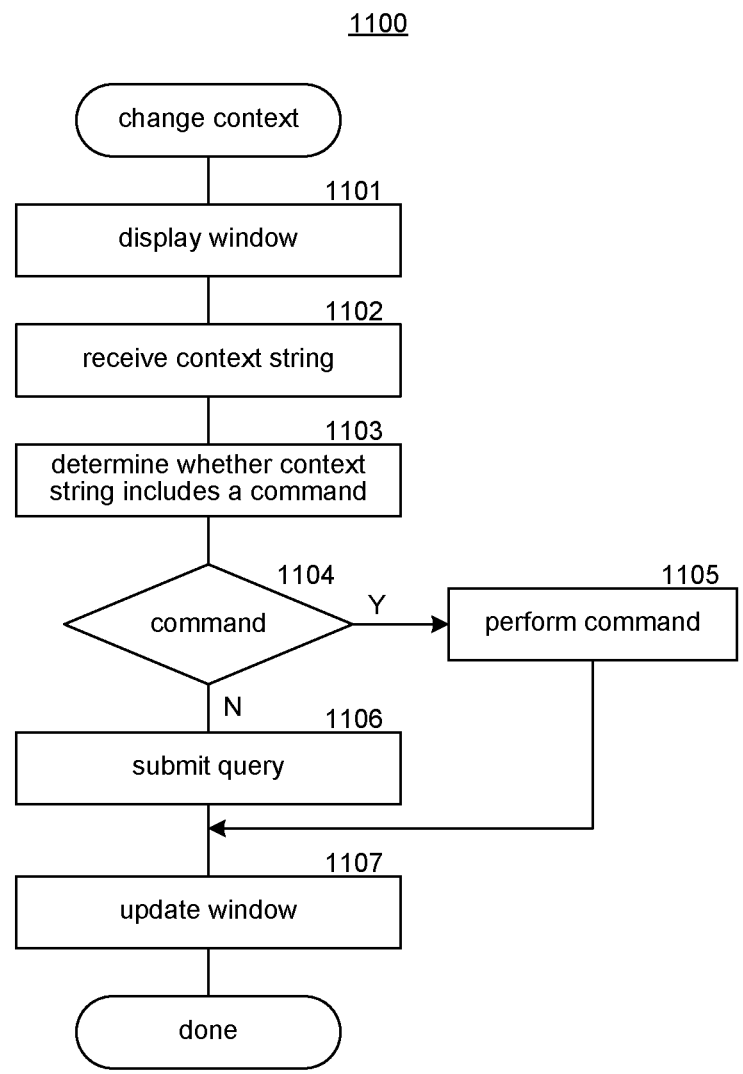
FIG. 11 is a flow diagram that illustrates processing of a change context component of the contextual window system in some embodiments.

FIG. 11 is a flow diagram that illustrates processing of a change context component of the contextual window system in some embodiments. A change context component 1100, which may be part of the UI controller 1010, displays a window and updates its content as the context changes. In block 1101, the component displays a window that includes a context input area. In block 1102, the component receives a context string via the context input area. In block 1103, the component determines whether the context string includes a command. In decision block 1104, if the context string includes a command, then the component continues at block 1105, else the component continues at block 1106. In block 1105, the component performs the command by invoking a function of the application program. In block 1106, the component submits a query based on the context string. In block 1107, the component updates the content of the window to reflect the next context and then completes.

Figure 12:
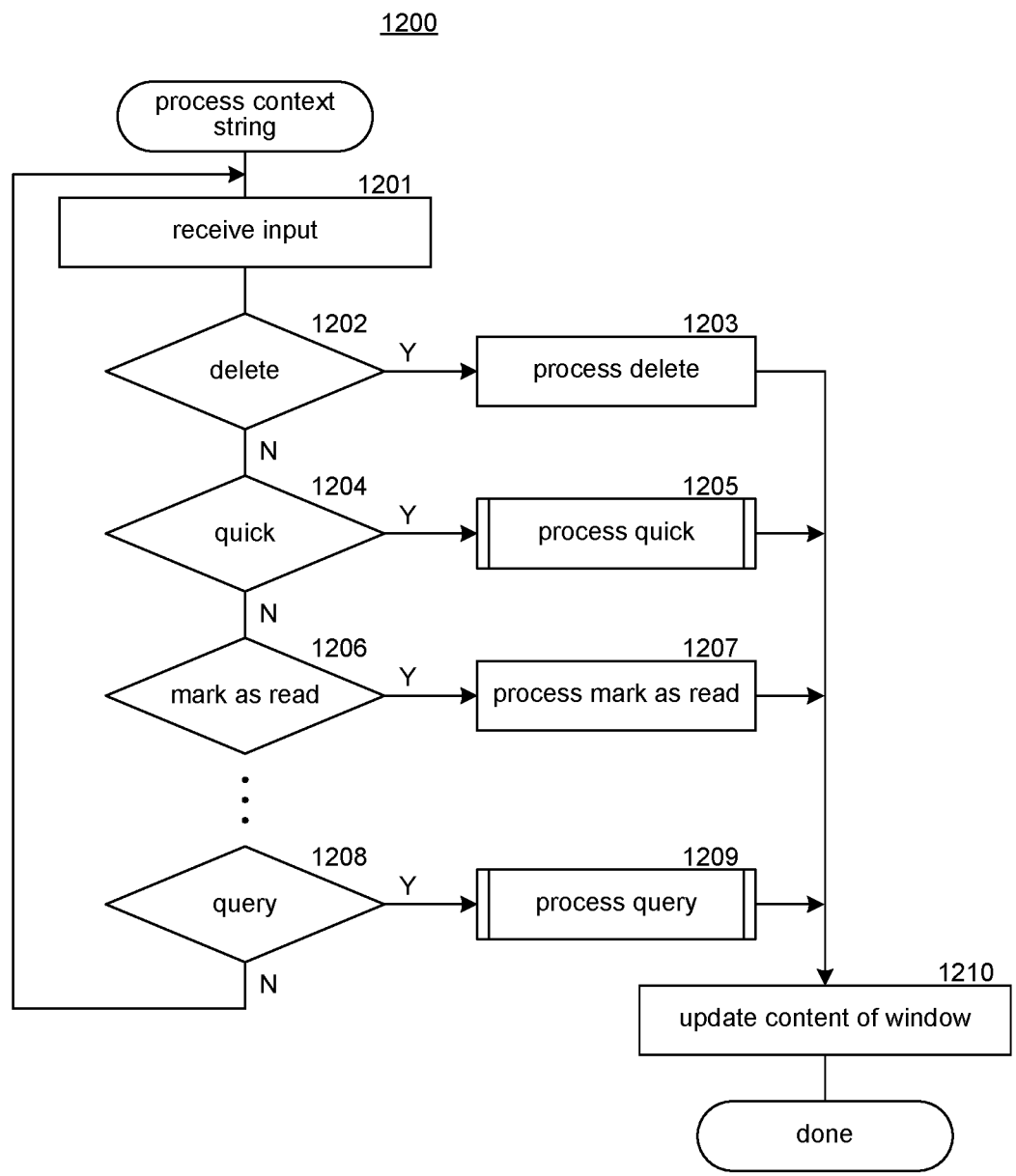
FIG. 12 is a flow diagram that illustrates processing of the context string for an email application in some embodiments.

FIG. 12 is a flow diagram that illustrates processing of the context string for an email application in some embodiments. A process context string component 1200 may be invoked to process the context string as the characters of the context string are entered into a context input area. In block 1201, the component receives an input character via the context input area. In decision block 1202, if the context string indicates that a delete command has been entered, then the component continues at block 1203, else the component continues at block 1204. In block 1203, the component processes a delete command and then continues at block 1210. In decision block 1204, if the current context string indicates that a quick command has been entered, then the component continues at block 1205, else the component continues at block 1206. In block 1205, the component invokes a component to process the quick command and then continues at block 1210. In decision block 1206, if the current context string indicates that a command to mark email messages as read has been received, then the component continues at block 1207, else the component continues at block 1208. In block 1207, the component processes the command to mark email messages as read and then continues at block 1210. In decision block 1208, if the context string is to be treated as a query, then the component continues at block 1209, else the component loops to block 1201 to receive the next input. In block 1209, the component invokes a process query component and then continues at block 1210. In block 1210, the component updates the content of the window and completes.

Figure 13:
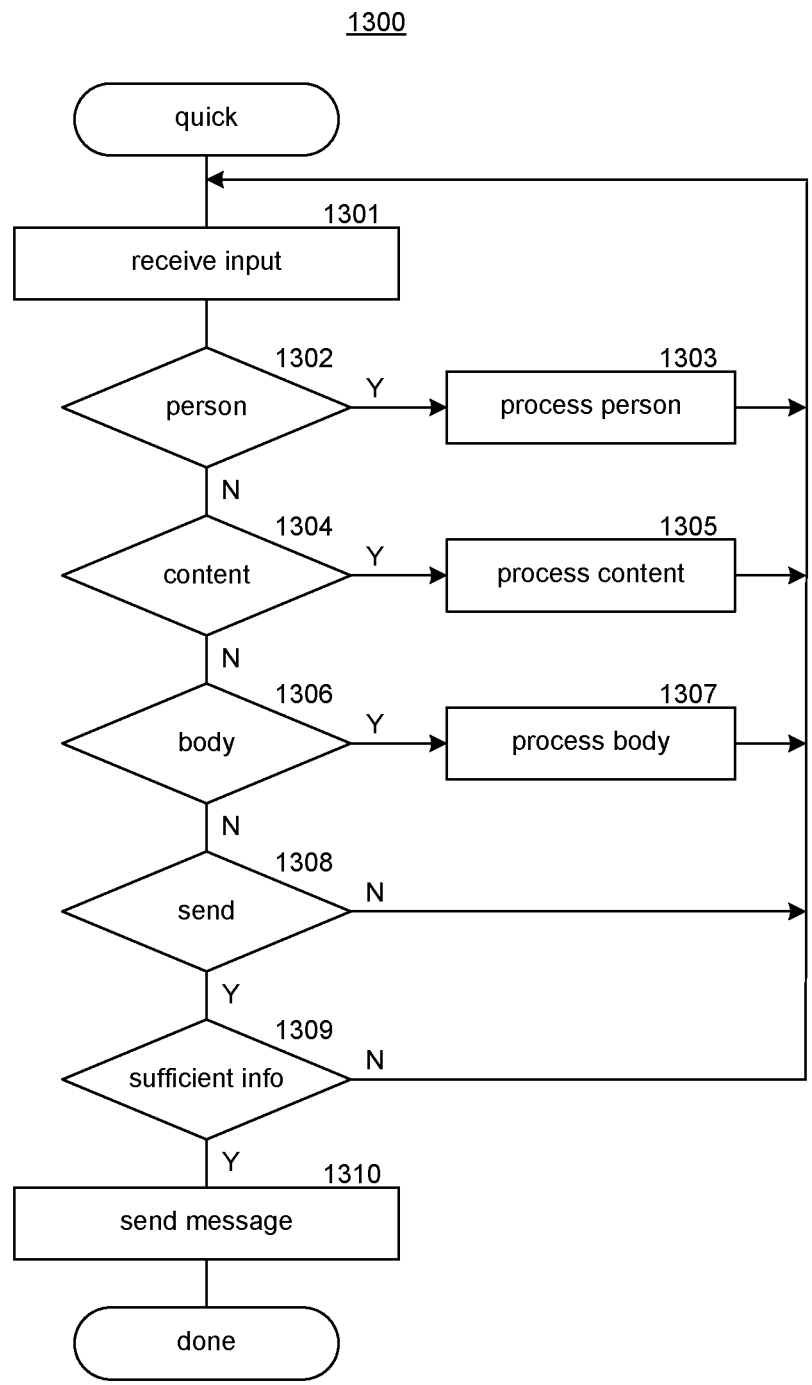
FIG. 13 is a flow diagram that illustrates processing of a quick command in some embodiments.

FIG. 13 is a flow diagram that illustrates processing of a quick command in some embodiments. A quick component 1300 is invoked when a quick command has been received via a context input area. In block 1301, the component waits to receive the next input. In decision block 1302, if a person parameter has been designated, then the component continues at block 1303, else the component continues at block 1304. In block 1303, the component processes the person as an intended recipient of the email message and then loops to block 1301 to receive the next input. In decision block 1304, if the received input relates to content for the email message, then the component continues at block 1305, else the component continues at block 1306. In block 1305, the component processes the content and then loops to block 1301 to receive the next input. In decision block 1306, if the context string indicates to include a body in the email message, then the component continues at block 1307, else the component continues at block 1308. In block 1307, the component processes the body by, for example, expanding the context input area to include an area for entry of the body. The component then loops to block 1301 to receive the next input. In decision block 1308, if the input indicates to send the email message, then the component continues at block 1310, else the component loops to block 1301 to receive the next input. In decision block 1309, if the context string contains sufficient information to send an email message, then the component continues at block 1310 to send the email message and then completes, else the component loops to block 1301 to receive the next input. Although not illustrated in FIG. 13, the component may also ensure that context string complies with a grammar for a quick command. For example, the grammar may require that the context string includes a person command and either content or a body command ("# body").

Figure 14:
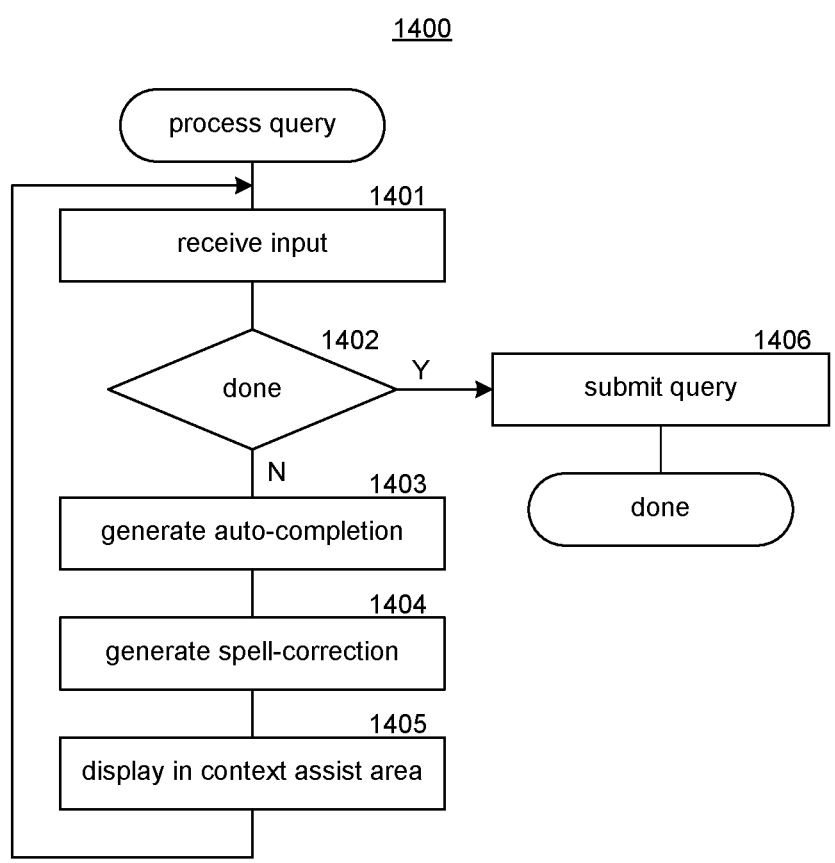
FIG. 14 is a flow diagram that illustrates the processing of a process query component in some embodiments.

FIG. 14 is a flow diagram that illustrates the processing of a process query component in some embodiments. A process query component 1400 is invoked to process the context string as a query. In block 1401, the component receives the next input. In decision block 1402, if the input is complete, then the component continues at block 1406, else the component continues at block 1403. In block 1403, the component generates spell-completion suggestions based on the context string that is received so far. In block 1404, the component generates spell-correction suggestions based on the context string that has been received so far. In block 1405, the component displays the auto-completion suggestions and/or the spell-correction suggestions in a context assist area and then loops to block 1401. In block 1406, the component submits the query and then completes. The component may alternatively automatically correct some misspellings.

Figure 15:
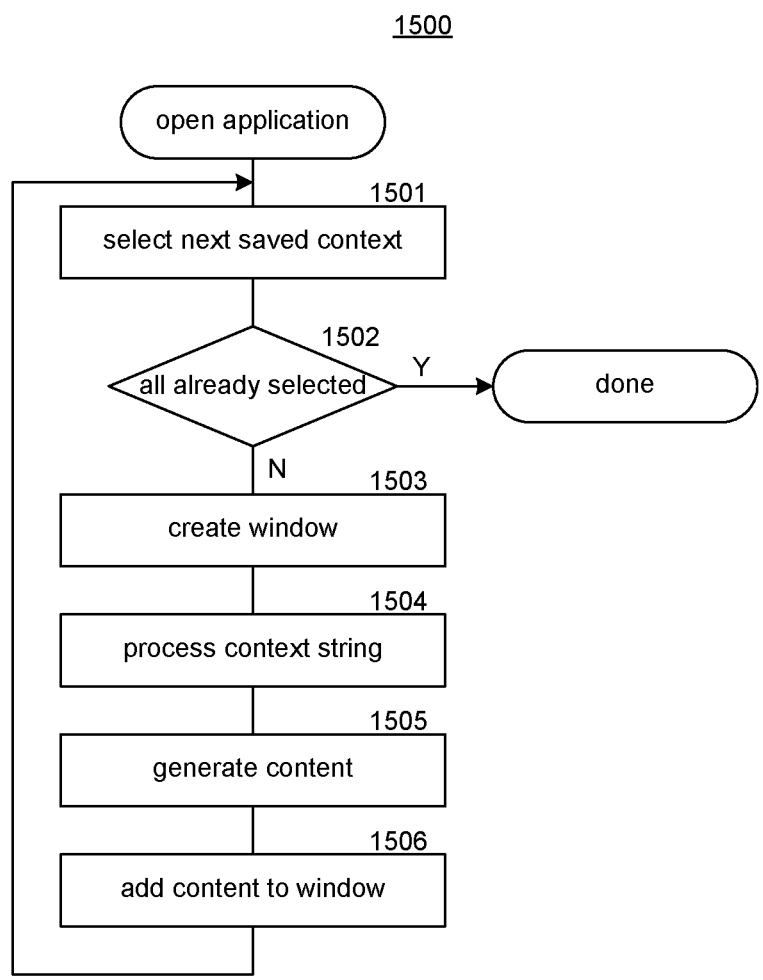
FIG. 15 is a flow diagram that illustrates processing of an open application component in some embodiments.

FIG. 15 is a flow diagram that illustrates processing of an open application component in some embodiments. An open application component 1500 may be invoked when an application is initially launched. The component creates windows for saved context. In block 1501, the component selects the next saved context. In decision block 1502, if all of the saved context has already been selected, then the component completes, else the component continues at block 1503. In block 1503, the component creates a window. In block 1504, the component processes the context string defining the context for the window. In block 1505, the component generates the content for the window. In block 1506 the component adds the content to the window and then loops to block 1501 to select the next saved context.

The following paragraphs describe various embodiments of aspects of the contextual window system. An implementation of the contextual window system may employ any combination of the embodiments. The processing described below may be performed by a computing device with a processor that executes computer-executable instructions stored on a computer-readable storage medium that implements the contextual window system.

A method performed by a computing device for changing content of a window of an application program is provided. The method displays a window with content based on a current context of the window. The method receives from a user a context string for a new context for the window. The method determines whether the context string includes a command. When the context string includes a command, the method performs a function of the application program that implements the command to change from the current context of the window to the new context of the window. The context string may include a parameter for the command. When the context string does not specify a command, the method submits the context string as a query for data of the application program to change from the current context of the window to the new context of the window. The method then modifies the content of the window to reflect the new context of the window. In some embodiments, a command is a string that includes a reserve symbol that identifies the string as a command and further the string may include text to specify a type of the command. In some embodiments, the method further dynamically modifies the content of the window as characters of the context string are received. In some embodiments, the method displays auto-completion suggestions as characters of the context string are received. In some embodiments, the method displays spelling correction suggestions as characters of the context string are received. In some embodiments, when the context string is determined to include a name, the method displays name suggestions based on a search of a directory of names. In some embodiments, the method displays in the window a context input area wherein the context string is received via the context input area. In some embodiments, the receiving of the context string includes recognizing voice input of the user. In some embodiments, in response to receiving an indication to persist the new context of the window, the method stores information relating to the context string and subsequently uses the stored information to update the content of the window. In some embodiments, the method creates multiple windows of the application program. Each window is for displaying content reflecting a different context of the application program.

In some embodiments, a computing device for changing content of a window of an application program based on a change from a current context to a new context of the window. The computing device includes a processor and a computer-readable storage medium that stores computer-executable instructions. The instructions are adapted to display a window with current content based on a current context of the window and with a context input area. The instructions are further adapted to receive from a user via the context input area a context string for a new context for the window. The instructions are further adapted to, when the context string includes a command, perform a function of the application program that implements the command to generate new content that reflects the change from the current context of the window to the new context of the window. The instructions are further adapted to, when the context string does not specify a command, use the context string as a query for locating data that matches the query as new content that reflects the change from the current context of the window to the new context of the window. The instructions are further adapted to replace the current content of the window with the new content of the window to reflect the new context of the window. In some embodiments, the instructions are adapted to replace the current content of the window with new content of the window as characters are added to or removed from the context input area so that the content of the window is changed as the user enters the context string. In some embodiments, the instructions are adapted to display auto-completion suggestions as characters of the context string are received. In some embodiments, the instructions are adapted to display spelling correction suggestions as characters of the context string are received. In some embodiments, the instructions are adapted to, when the context string is determined to include a name, display name suggestions based on search of a directory of names. In some embodiments, the instructions are adapted to, in response to receiving an indication to persist the new context of the window, store information relating to the context string, and subsequently using the stored information to update the content of the window. In some embodiments, the instructions are adapted to create multiple windows of the application program, each window for displaying content reflecting a different context.

In some embodiments, a computer-readable storage medium is provide that stores computer-executable instructions that when executed by a processor control a computing device to change content of a window of an application program based on a change from a current context to a new context of the window. The instructions are adapted to display a window with current content based on a current context of the window and with a context input area. The instructions are further adapted to receive from a user via the context input area a context string for a new context for the window. The instructions are further adapted to process the context string when the context string includes a command, a function of the application program is invoked that implements the command to generate new content that reflects the change from the current context of the window to the new context of the window; and when the context string does not specify a command, the context string is used as a query for locating data that matches the query as new content that reflects the change from the current context of the window to the new context of the window. The instructions are further adapted to replace the current content of the window with the new content of the window to reflect the new context of the window. In some embodiments, the instructions are adapted to process the context string as characters are added to or removed from the context input area so that the content of the window is changed as the user enters the context string.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A method performed by a computing device for changing content of a window of an application program, the method comprising:
    displaying the window with the content based on a current context of the window;
    receiving, from a user in a context input area displayed proximate the window, a context string for a new context for the window;
    displaying, in a context assist box displayed over a portion of the window, auto-completion suggestions as characters of the context string are received;
    determining whether the context string includes a command;
    when the context string includes a command that indicates an operation to be performed on the content, performing a function of the application program that implements the command on the content to change a portion of the content and to change from the current context of the window to the new context of the window including the changed content and unchanged content, the context string further includes a parameter for the command;
    when the context string does not specify a command, submitting the context string as a query for data of the application program to change from the current context of the window to the new context of the window; and
    modifying the content of the window to reflect the new context of the window.

2. The method of claim 1 wherein a command is a string that includes a reserve symbol that identifies the string as a command.

3. The method of claim 2 wherein the string includes text to specify a type of the command.

4. The method of claim 1 further comprising dynamically modifying the content of the window as characters of the context string are received.

5. The method of claim 1 further comprising displaying spelling correction suggestions as characters of the context string are received.

6. The method of claim 1 further comprising when the context string is determined to include a name, displaying name suggestions based on a search of a directory of names.

7. The method of claim 1 further comprising displaying in the window a context input area wherein the context string is received via the context input area.

8. The method of claim 1 wherein the receiving of the context string includes recognizing voice input of the user.

9. The method of claim 1 further comprising in response to receiving an indication to persist the new context of the window, storing information relating to the context string and subsequently, upon launch of the application program, using the stored information to update the content of the window, and provide a view of all persisted windows.

10. The method of claim 1 further comprising creating multiple windows of the application program, each window for displaying content reflecting a different context of the application program.

11. A computing device for changing content of a window of an application program based on a change from a current context to a new context of the window, the computing device comprising:
    a processor; and
    a computer-readable storage medium storing computer-executable instructions that when executed by the processor control the computing device to:
        display the window with the current content based on a current context of the window and with a context input area displayed proximate the window;
        receive from a user via the context input area a context string for a new context for the window;
        display, in a context assist box displayed over a portion of the window, auto-completion suggestions as characters of the context string are received:
        when the context string includes a command that indicates an operation to be performed on the content, perform a function of the application program that implements the command on the content to change a portion of the content and to generate new content that reflects the change from the current context of the window to the new context of the window the new context of the window including the changed content and unchanged content;
        when the context string does not specify a command, use the context string as a query for locating data that matches the query as new content that reflects the change from the current context of the window to the new context of the window; and
        replace the current content of the window with the new content of the window to reflect the new context of the window.

12. The computing device of claim 11 wherein the computer-executable instructions further include instructions that when executed by the processor control the computing device to replace the current content of the window with new content of the window as characters are added to or removed from the context input area so that the content of the window is changed as the user enters the context string.

13. The computing device of claim 12 wherein the computer-executable instructions further include instructions that when executed by the processor control the computing device to display spelling correction suggestions as characters of the context string are received.

14. The computing device of claim 12 wherein the computer-executable instructions further include instructions that when executed by the processor control the computing device to, when the context string is determined to include a name, display name suggestions based on search of a directory of names.

15. The computing device of claim 11 wherein the computer-executable instructions further include instructions that when executed by the processor control the computing device to, in response to receiving an indication to persist the new context of the window, store information relating to the context string, and subsequently using the stored information to update the content of the window.

16. The computing device of claim 11 wherein the computer-executable instructions further include instructions that when executed by the processor control the computing device to create multiple windows of the application program, each window for displaying content reflecting a different context.

17. A non-transitory computer-readable storage medium storing computer-executable instructions that when executed by a processor control a computing device to change content of a window of an application program based on a change from a current context to a new context of the window, the instructions comprising instructions that:

display the window with current content based on the current context of the window and with a context input area displayed proximate the window;

receive from a user via the context input area a context string for a new context for the window;

display, in a context assist box displayed over a portion of the window, auto-completion suggestions as characters of the context string are received;

process the context string so that when the context string includes a command to be performed on the content, a function of the application program is invoked that implements the command on the content to change a portion of the content, to generate new content that reflects the change from the current context of the window to the new context of the window the new context including the changed content and unchanged content; and when the context string does not specify a command, the context string is used as a query for locating data that matches the query as new content that reflects the change from the current context of the window to the new context of the window; and replacing the current content of the window with the new content of the window to reflect the new context of the window.

18. The non-transitory computer-readable storage medium of claim 17 wherein the instructions further include instructions to process the context string as characters are added to or removed from the context input area so that the content of the window is changed as the user enters the context string.

* * * * *